United States Patent
Lewis et al.

(10) Patent No.: US 11,434,410 B2
(45) Date of Patent: Sep. 6, 2022

(54) METHODS OF MAKING AND USING A WELLBORE SERVICING FLUID FOR CONTROLLING LOSSES IN PERMEABLE ZONES

(71) Applicant: Halliburton Energy Services, Inc., Houston, TX (US)

(72) Inventors: Samuel J. Lewis, Houston, TX (US); Sandip Prabhakar Patil, Pune (IN); William Cecil Pearl, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 16/922,243

(22) Filed: Jul. 7, 2020

(65) Prior Publication Data
US 2022/0010192 A1    Jan. 13, 2022

(51) Int. Cl.
*E21B 33/138* (2006.01)
*C09K 8/504* (2006.01)
(Continued)

(52) U.S. Cl.
CPC ............ *C09K 8/5045* (2013.01); *C09K 8/032* (2013.01); *C09K 8/035* (2013.01); *C09K 8/40* (2013.01);
(Continued)

(58) Field of Classification Search
None
See application file for complete search history.

(56) References Cited

U.S. PATENT DOCUMENTS 3,496,902 A * 2/1970 Kern ...................... E21B 21/003
175/72
4,120,369 A   10/1978 Fischer et al.
(Continued)

FOREIGN PATENT DOCUMENTS

EP          3495606 A2     6/2019
WO    WO-2004013251 A1 *  2/2004   ................ C08J 3/12
(Continued)

OTHER PUBLICATIONS

M.A. Dick, SPE 58793, Optimizing the Selection of Bridging Particles for Reservoir Drilling Fluids, Society of Petroleum Engineers, Feb. 23-24, 2000 (Year: 2000).*
(Continued)

*Primary Examiner* — Angela M DiTrani Leff
(74) *Attorney, Agent, or Firm* — Conley Rose, P.C.; Rodney B. Carroll (57) ABSTRACT

A method of servicing a wellbore penetrating a subterranean formation, comprising placing a wellbore servicing fluid (WSF) into the wellbore proximate a permeable zone having an average fracture width of about W microns, wherein the WSF comprises a particulate blend and water, and wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5.

20 Claims, 2 Drawing Sheets

(51) Int. Cl.
    *C09K 8/516* (2006.01)
    *E21B 43/25* (2006.01)
    *C09K 8/035* (2006.01)
    *C09K 8/03* (2006.01)
    *C09K 8/40* (2006.01)
    *C09K 8/42* (2006.01)
    *E21B 43/26* (2006.01)

(52) U.S. Cl.
    CPC ............... *C09K 8/42* (2013.01); *C09K 8/516* (2013.01); *E21B 43/255* (2013.01); *E21B 43/261* (2013.01)

(56) References Cited

U.S. PATENT DOCUMENTS

| | | | |
|---|---|---|---|
| 4,958,685 | A | 9/1990 | Hihara et al. |
| 5,504,062 | A * | 4/1996 | Johnson .................. C09K 8/50 507/140 |
| 6,664,215 | B1 | 12/2003 | Tomlinson |
| 7,284,611 | B2 | 10/2007 | Reddy et al. |
| 7,350,576 | B2 | 4/2008 | Robertson et al. |
| 9,410,066 | B2 | 8/2016 | Ghassemzadeh |
| 10,035,941 | B2 | 7/2018 | Whitfill et al. |
| 11,091,964 | B1 | 8/2021 | Whitfill et al. |
| 2005/0000690 | A1 * | 1/2005 | Boney .................. E21B 33/138 166/280.2 |
| 2005/0199390 | A1 | 9/2005 | Curtice et al. |
| 2010/0152070 | A1 * | 6/2010 | Ghassemzadeh ...... C09K 8/035 507/221 |
| 2010/0230164 | A1 * | 9/2010 | Pomerleau ........... C09K 8/5045 175/40 |
| 2015/0292278 | A1 * | 10/2015 | Wang .................... C09K 8/516 166/292 |
| 2016/0137903 | A1 * | 5/2016 | Friedheim .............. C09K 8/502 166/285 |
| 2016/0145483 | A1 * | 5/2016 | Lecerf .................. C09K 8/426 166/308.2 |
| 2017/0369757 | A1 | 12/2017 | Pisklak et al. |

FOREIGN PATENT DOCUMENTS

| | | |
|---|---|---|
| WO | 2005078235 A1 | 8/2005 |
| WO | 2008077499 A1 | 7/2008 |
| WO | 2018160253 A1 | 9/2018 |
| WO | 2020142064 A1 | 7/2020 |

OTHER PUBLICATIONS

BioPOWDER.com, Walnut Shell Powder, retrieved Jun. 7, 2021 from https://www.bio-powder.com/en/walnut-shell (Year: NA).*

Reade, Mohs Hardness (Typical) of Abrasives), retrieved Jun. 7, 2021 from https://www.reade.com/reade-resources/reference-educational/reade-reference-chart-particle-property-briefings/32-mohs-hardness-of-abrasives (Year: NA).*

Foreign Communication from Related Application—International Search Report and Written Opinion of the International Searching Authority, International Application No. PCT/US2020/041987, dated Mar. 11, 2021, 10 pages.

Foreign Communication from Related Application—International Search Report and Written Opinion of the International Searching Authority, International Application No. PCT/US2020/063899, dated Mar. 18, 2021, 12 pages.

Filing Receipt, Specification and Drawings for U.S. Appl. No. 63/000,184, entitled "Method to Manage Tandem Single String Reactive LCM Pill Applications," filed Mar. 26, 2020, 61 pages.

Abdulrazzaq, Waseem et al., "Chemical Sealant Loss Circulation Materials for Fractured Formations: Right-Angle Viscosity Development with High Plugging Efficiency," SPE Kingdom of Saudi Arabia Annual Technical Symposium and Exhibition, Apr. 2018, SPE-192328-MS, 9 pages, Society of Petroleum Engineers.

Savari, Sharath et al., "Next-Generation, Right-Angle-Setting Composition for Eliminating Total Loss Circulation," presented at SPE/IADC Middle East Drilling Technology Conference and Exhibition, Oct. 2013, SPE/IADC 166697, 5 pages, SPE/IADC Middle East Drilling Technology Conference and Exhibition.

Tirado, Guillermo et al., "A Novel Heat-Activation RSF to Treat Severe Case of Lost Circulation: Case Histories from Mexico," presented at IADC/SPE Drilling Conference, Mar. 2008, IADC/SPE 112645, 15 pages, IADC/SPE Drilling Conference.

Vasquez, Julio et al., "A Novel Temperature-Activated, Rigid-Setting Material: Case Histories and Lessons Learned After More than 500 Well Interventions for Drilling and Conformance Applications," presented at SPE Annual Technical Conference and Exhibition, Oct. 2013, SPE 166221, 10 pages, Society for Petroleum Engineers.

Vasquez, J., "A Novel Temperature-Activated, Rigid-Setting Material: Case Histories for Drilling and Conformance Offshore Applications," presented at Offshore Technology Conference Brazil, Oct. 2013, OTC 24417, 13 pages, Offshore Technology Conference.

* cited by examiner

Page number: 1 (US 11,434,410 B2)

METHODS OF MAKING AND USING A WELLBORE SERVICING FLUID FOR CONTROLLING LOSSES IN PERMEABLE ZONES

BACKGROUND

This disclosure relates to methods of making and using a wellbore servicing fluid in a wellbore. More specifically, it relates to methods of making and introducing a wellbore servicing fluid into a wellbore penetrating a subterranean formation.

Natural resources such as gas, oil, and water residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. Drilling may be halted and a string of casing is run into the wellbore, where residual drilling fluid may fill a volume provided by the interior of the casing string and/or an annular space provided between the exterior of the casing string and the interior wall of the wellbore. A spacer fluid is usually placed in the wellbore to physically separate the residual drilling fluid from a cementitious fluid being placed downhole after the spacer fluid. The cementitious fluid is placed into the wellbore downward through the interior of the casing string and upward through the annulus wherein the cement is allowed to set into a hard mass (i.e., sheath) to thereby attach the casing string to the walls of the wellbore and seal the annulus. Prior to initiation of production, a completion fluid is introduced to the wellbore to facilitate final operations such as setting screens, production liners, packers, downhole valves or shooting perforations into the producing zone.

Also, in various scenarios, fluid in a wellbore may communicate with fluid in the subterranean formation around the wellbore. It is well known that wellbores pass through a number of zones within a subterranean formation other than the particular hydrocarbon zones of interest. Some of these zones are permeable (i.e., permeable zones), and thus may have water influx, gas influx, or both from the subterranean formation surrounding a wellbore into the wellbore. In one scenario, undesired water production, gas production, or both can affect the economic life of hydrocarbon producing wells and can potentially induce other types of problems, such as sand production, scale, and corrosion of tubulars. In another scenario, fluids used in servicing a wellbore may be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the wellbore servicing fluid (e.g., drilling fluid), and so forth. As a result, the service provided by such wellbore servicing fluids is more difficult to achieve.

Accordingly, an ongoing need exists for compositions and methods of treating fluid loss in a wellbore.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, a "wellbore servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, drilling fluids or muds, spacer fluids, lost circulation fluids, cement slurries, washing fluids, sweeping fluids, acidizing fluids, fracturing fluids, gravel packing fluids, diverting fluids or completion fluids. It is to be understood that "subterranean formation" encompasses both areas below exposed earth and areas below earth covered by water such as ocean or fresh water.

Herein in the disclosure, "top" means the well at a well surface (e.g., at a wellhead which may be located on dry land or below water, e.g., a subsea wellhead), and the direction along a wellbore towards the well surface is referred to as "up"; "bottom" means the end of a wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location.

A wellbore servicing fluid (WSF) is a fluid designed and prepared to resolve a specific wellbore or reservoir condition. This disclosure involves a WSF that has fluid loss control properties. The WSF can be used as a drilling fluid, a fluid loss control fluid (also referred to as a lost circulation fluid herein), a spacer fluid, a cement fluid (also referred to as a cementitious fluid herein), or a completion fluid.

Disclosed herein is a method of servicing a wellbore penetrating a subterranean formation. The method can comprise placing a wellbore servicing fluid (WSF) into the wellbore proximate a permeable zone. As used herein, a permeable zone in the wellbore refers to an area in the wellbore or the subterranean formation adjacent to the wellbore through which fluid can undesirably migrate. Such permeable zones may be present in, for example, the subterranean formation surrounding a wellbore, the wall of a conduit disposed in the wellbore such as a casing, a sealant/cement column disposed in an annulus of the wellbore between the casing and a subterranean formation penetrated by the wellbore, a microannulus interposed between the casing and the sealant/cement column, a microannulus interposed between the sealant/cement column and the formation, or combinations thereof. Permeable zones can include fluid flow paths extending between the wellbore and the surrounding formation, for example, a fissure, a crack, a fracture, a vug, a streak, a flow channel, a void, a perforation formed by a perforating gun, and combinations thereof. In embodiments, the permeable zone is a loss circulation zone such as a fracture through which fluids being circulated in the wellbore can undesirably pass from the wellbore into the subterranean formation. In other embodiments, the permeable zone allows a formation fluid such as water to pass from the surrounding formation into the wellbore and thus form crossflows in fluids residing in the wellbore such as a cement slurry before it sets. In a permeable zone, the average size of the openings of the fluid flow paths is herein referred to as an average fracture width of the permeable zone. In embodiments, the average fracture width of a permeable zone is W. In embodiments, W is from about 10 microns to about 5000 microns, alternatively from about 10 microns to about 4000 microns, alternatively from about 20 microns to about 3500 microns or alternatively from about 30 microns to about 3000 microns.

A WSF as disclosed herein can comprise a particulate blend and water. The particulate blend can comprise a type A particulate material and a type B particulate material where the type A particulate material is characterized by a weight average particle size of equal to or greater than about W/3 microns, and the type B particulate material is characterized by a weight average particle size of less than about W/3 microns.

In embodiments, the type B particulate material is harder than the type A particulate material. In embodiments, the type B particulate material is characterized by a Mohs hardness of equal to or greater than about 3, alternatively equal to or greater than about 3.5 or alternatively equal to or greater than about 4. The type A particulate material can be characterized by a Mohs hardness of less than about 4, alternatively less than about 3.5, alternatively less than about 3, alternatively less than about 2.8 or alternatively less than about 2.6.

The type A particulate material and the type B particulate material can be compositionally different. Examples of the type A particulate material include, but are not limited to graphite, calcined petroleum coke, ground laminate, ground tires, ground nut shells, mica particles, polypropylene fibers, and polymeric beads. Examples of the type B particulate material include, but are not limited to calcium carbonate (e.g., ground marble), glass particles, sand, ceramic particles, and ground battery casings. Commercial examples of the type B particulate material include but are not limited to BARACARB® 5 sized-calcium carbonate, BARACARB® 25 sized-calcium carbonate, BARACARB® 50 sized-calcium carbonate, and BARACARB® 150 sized-calcium carbonate, which are commercially available from Halliburton Energy Services, Inc.

The particulate blend can have a physical shape of platelets, shavings, fibers, flakes, ribbons, rods, strips, spheroids, toroids, pellets, tablets, or any other physical shape. The particulate blend can have a multimodal particle size distribution. The particulate blend having a multimodal particle size distribution may have a bimodal particle size distribution, a trimodal particle size distribution, or other suitable particle size distribution as desired, inter alia, on a particular application. In embodiments, the particulate blend comprises a first portion of particulate material having a weight average particle size in a range of from about 4000 microns to about 5000 microns, a second portion of particulate material having a weight average particle size in a range of from about 1000 microns to about 4000 microns, and a third portion of particulate material having a weight average particle size in the range of from about 10 microns to about 1000 microns.

In embodiments, the type A particulate material has a weight average particle size of from about 170 microns to about 1700 microns, alternatively from about 170 microns to about 1400 microns, alternatively from about 190 microns to about 1400 microns or alternatively from about 220 microns to about 1400 microns. The type B particulate material can have a weight average particle size of from about 3 microns to about 1000 microns, alternatively from about 3 microns to about 800 microns, alternatively from about 3 microns to about 600 microns, alternatively from about 3 microns to about 400 microns, alternatively from about 3 microns to about 240 microns, alternatively from about 3 microns to about 170 microns, alternatively from about 10 microns to about 170 microns or alternatively from about 10 microns to about 150 microns.

Sufficient amounts of particulate blend including type A particulate material and type B particulate material can be added to the WSF to improve the effectiveness of the WSF in reducing or preventing circulation losses and withstanding increased pressures. A total amount of the particulate blend in the WSF can be from about 3 wt. % to about 25 wt. % based on the total weight of the WSF, alternatively from about 5 wt. % to about 20 wt. % or alternatively from about 5 wt. % to about 15 wt. %. In embodiments, a total amount of the particulate blend in the WSF is from about 3 lb per barrel (lb/bbl) to about 60 lb/bbl based on the total volume of the WSF, alternatively from about 4 lb/bbl to about 60 lb/bbl or alternatively from about 4 lb/bbl to about 55 lb/bbl. In embodiments, the weight ratio of type A particulate material to type B particulate material is from about 0.05 to about 5, alternatively from about 0.17 to about 5 or alternatively from about 1 to about 4.

The WSF can comprise water. The water can be selected from a group consisting of freshwater, seawater, saltwater, brine (e.g., underground natural brine, formulated brine, etc.), and combinations thereof. A formulated brine may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the WSF. The water can be present in the WSF in an amount effective to provide a slurry having desired (e.g., job or service specific) rheological properties. The water can be present in the WSF in an amount of from about 20 wt. % to about 95 wt. % based on the total weight of the WSF, alternatively from about 25 wt. % to about 95 wt. % or alternatively from about 30 wt. % to about 95 wt. %.

In embodiments, the WSF further comprises a cementitious material and can be referred to as a cementitious fluid. The cementitious material can comprise calcium, aluminum, silicon, oxygen, iron, and/or sulfur. In embodiments, the cementitious material comprises Portland cement, pozzolana cement, gypsum cement, shale cement, acid cement, base cement, phosphate cement, high alumina content cement, slag cement, silica cement, high alkalinity cement, magnesia cement, or combinations thereof. Portland cements that are suited for use in the disclosed WSF include, but are not limited to, Class A, C, G, H, low sulfate resistant cements, medium sulfate resistant cements, high sulfate resistant cements, or combinations thereof. The class A, C, G, and H cements are classified according to API Specification 10. In embodiments, "high alumina content cement" refers to a cement having an alumina concentration in the range of from about 40 wt. % to about 80 wt. % by a weight of the high alumina content cement. In embodiments, "high alkalinity cement" refers to a cement having a sodium oxide concentration in the range of from about 1.0 wt. % to about 2.0 wt. % by a weight of the high alkalinity cement.

The cementitious material can be present in the WSF in an amount of from about 30 wt. % to about 80 wt. % based on the total weight of the WSF, alternatively from about 35 wt. % to about 75 wt. % or alternatively from about 40 wt. % to about 70 wt. %.

In embodiments, the WSF further comprises a gelling agent. Nonlimiting examples of gelling agents suitable for use in the present disclosure include locust bean gum, Karaya gum, gum tragacanth, hydrophobically modified guars, high-molecular weight polysaccharides composed of mannose and galactose sugars, heteropolysaccharides obtained by fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, and combinations thereof.

In embodiments, the gelling agent has a molecular weight in a range of from equal to or greater than about 0.5 MM g/mol to equal to or less than about 5 MM g/mol, alternatively from equal to or greater than about 0.8 MM g/mol to equal to or less than about 5 MM g/mol, alternatively from equal to or greater than about 1.0 MM g/mol to equal to or less than about 5 MM g/mol, which can be measured by Gel Permeation chromatography (GPC). The gelling agent can be present in the WSF in an amount of from about 0.001 wt. % to about 5 wt. %, based on the total weight of the WSF, alternatively from about 0.001 wt. % to about 4 wt. % or alternatively from about 0.01 wt. % to about 3 wt. %.

In embodiments, the WSF further comprises a fluid loss control additive. The fluid loss control additive can comprise a polymer of methacrylates, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), acrylamide, N—N dimethyl acrylamide, 2-Acrylamido-2-methylpropane sulfonic acid (AMPS), N-vinyl pyrrolidone, acryloylmorpholine, or combinations thereof. The fluid loss control additive can be present in the WSF in an amount of from about 0.001 wt. % to about 10 wt. % based on the total weight of the WSF, alternatively from about 0.01 wt. % to about 9 wt. % or alternatively from about 0.1 wt. % to about 8 wt. %.

The WSF can further comprise clay. The clay can comprise a natural clay, a synthetic clay, or combinations thereof. In embodiments, the clay comprises bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof. The clay can be present in the WSF in an amount of from about 1 wt. % to about 20 wt. % based on the total weight of the WSF, alternatively from about 2 wt. % to about 15 wt. % or alternatively from about 3 wt. % to about 10 wt. %.

The WSF can further comprise a pH adjusting agent. The pH adjusting agent can be a base, an acid, or a buffer. Nonlimiting examples of bases suitable for use in the present disclosure include ammonium, alkali metal, and alkaline earth metal carbonates and bicarbonates, such as $Na_2CO_3$, $K_2CO_3$, $CaCO_3$, $MgCO_3$, $NaHCO_3$, and $KHCO_3$; alkali and alkaline earth metal oxides, such as BaO, SrO, $Li_2O$, CaO, $Na_2O$, $K_2O$, and MgO; ammonium, alkali metal, and alkaline earth metal hydroxides, such as NaOH, $NH_4OH$, KOH, LiOH, and $Mg(OH)_2$; and alkali and alkaline earth metal phosphates, such as $Na_3PO_4$ and $Ca_3(PO_4)_2$. Nonlimiting examples of acids suitable for use in the present disclosure include mineral acids such as hydrochloric acid, sulphuric acid, sulphonic acid, and sulphamic acid; organic acids such as tartaric acid, citric acid, formic acid, acetic acid, monochloroacetic acid, dichloroacetic acid, trichloroacetic acid, sulphinic acid, methanesulfonic acid, lactic acid, glycolic acid, oxalic acid, propionic acid, and butyric acid; ammonium salts and salts of weak bases, such as organic amines; or combinations thereof. The buffer can comprise a combination of weak acids or weak bases, in combination with the corresponding salts to maintain the pH of a fluid in a desired range. Nonlimiting examples of chemical combinations which can be used as buffers include acetic acid/sodium acetate, sodium carbonate/sodium bicarbonate, and sodium dihydrogen phosphate/sodium monohydrogen phosphate.

In embodiments, the pH adjusting agent may be present in the WSF in a suitable amount that will provide a desired pH. The pH adjusting agent can be present in the WSF in an amount of from about 1 wt. % to about 15 wt. % based on the total weight of the WSF, alternatively from about 1 wt. % to about 10 wt. % or alternatively from about 1 wt. % to about 5 wt. %.

The WSF can further comprise one or more additives. The one or more additives can be included in the WSF for improving or changing the properties thereof. The one or more additives can comprise a viscosifier, an emulsifier, a defoamer, an expansion agent, a salt, a corrosion inhibitor, a mutual solvent, a breaking agent, a relative permeability modifier, a crosslinker, a flocculant, a water softener, an oxidation inhibitor, a thinner, a scavenger, a gas scavenger, a lubricant, a friction reducer, a bridging agent, a vitrified shale, a thixotropic agent, a dispersing agent, a weight reducing additive, a heavyweight additive, a surfactant, a scale inhibitor, a clay control agent, a clay stabilizer, a silicate-control agent, a biocide, a biostatic agent, a storage stabilizer, a filtration control additive, a suspending agent, a foaming agent, latex emulsions, a formation conditioning agent, elastomers, gas/fluid absorbing materials, resins, superabsorbers, mechanical property modifying additives, inert particulates, and the like, or combinations thereof. The one or more additives can be present in the WSF in an amount of from about 0 wt. % to about 15 wt. % based on the total weight of the WSF, alternatively from about 1 wt. % to about 12 wt. % or alternatively from 2 wt. % to about 10 wt. %.

In embodiments, the WSF can have a density of from about 7 pounds per gallon (lb/gal) to about 20 lb/gal, alternatively from about 7 lb/gal to about 15 lb/gal or alternatively from about 7 lb/gal to about 13 lb/gal.

A WSF of the type disclosed herein can be used to minimize fluid loss in operation. For example, the WSF can have an actual fluid loss of from about 10 ml per 30 minutes to about 80 ml per 30 minutes on a 60 mesh screen, alternatively from about 10 ml per 30 minutes to about 75 ml per 30 minutes or alternatively from about 15 ml per 30 minutes to about 75 ml per 30 minutes, at about 180° F. when measured in accordance with test standard API-RP-10B-2. The actual fluid loss refers to fluid loss in milliliter (ml) that is actually collected in the measurement. In embodiments, the WSF can have an actual fluid loss of from about 10 ml per 30 minutes to about 80 ml per 30 minutes on a slot with a width of about W microns, alternatively from about 10 ml per 30 minutes to about 75 ml per 30 minutes or alternatively from about 15 ml per 30 minutes to about 75 ml per 30 minutes, at about 180° F. when measured in accordance with test standard API-RP-10B-2.

In embodiments, a WSF of the type disclosed herein has an actual fluid loss of from about 20 ml per 30 minutes to about 120 ml per 30 minutes on a 60 mesh screen, alternatively from about 30 ml per 30 minutes to about 100 ml per 30 minutes or alternatively from about 30 ml per 30 minutes to about 90 ml per 30 minutes, at about 300° F. when measured in accordance with test standard API-RP-10B-2. In embodiments, the WSF has an actual fluid loss of from about 20 ml per 30 minutes to about 120 ml per 30 minutes on a slot with a width of about W microns, alternatively from about 30 ml per 30 minutes to about 100 ml per 30 minutes or alternatively from about 30 ml per 30 minutes to about 90 ml per 30 minutes, at about 300° F. when measured in accordance with test standard API-RP-10B-2.

A WSF of the type disclosed herein can be prepared using any suitable method. In embodiments, the method comprises placing a mixture including a particulate blend of the type disclosed herein and water into a suitable container (e.g., a mixer, a blender) and blending the mixture until the mixture becomes a pumpable fluid (e.g., a homogeneous fluid). The container can be any container that is compatible with the mixture and has sufficient space for the mixture. A blender or mixer can be used for blending/mixing the mixture.

The WSF can be prepared at the wellsite. For example, the solid composition (e.g., the particulate blend, one or more additives) of the WSF can be transported to the wellsite and combined (e.g., mixed/blended) with water located proximate the wellsite to form the WSF. The solid composition of the WSF can be prepared at a location remote from the wellsite and transported to the wellsite, and, if necessary, stored at the on-site location. When it is desirable to prepare the WSF on the wellsite, the solid composition of the WSF along with additional water and optional other additives can be added into a container (e.g. a blender tub, for example mounted on a trailer), and the mixture is then blended until the mixture becomes a pumpable fluid (e.g., a homogeneous fluid). Additives can be added to the WSF during preparation thereof (e.g., during blending) and/or on-the-fly (e.g., in real time or on-location) by addition to (e.g., injection into) the WSF when being pumped into the wellbore.

The WSF disclosed herein (i.e., comprising a particulate blend of Type A and Type B particulate materials) can be used as a spacer fluid to physically separate two or more fluids present in a wellbore. The spacer fluid can be placed between two fluids (the first fluid and the second fluid) contained or to be pumped within a wellbore. The spacer fluid can physically space the first fluid apart from the second fluid such that the first fluid and the second fluid do not comingle while being placed (e.g., pumped) into the wellbore. In embodiments, the spacer fluid can be used to space apart two fluids (e.g., drilling fluid/mud and a cementitious fluid) that are being flowed from the surface down through a conduit (e.g., casing) present in the wellbore, exiting the conduit and flowing back upward in the annular space between the outside conduit wall and interior face of the wellbore. In embodiments, the spacer fluid can be used to space apart two fluids (e.g., drilling fluid/mud and a cementitious fluid) that are being flowed from the surface down through the annular space between the outside conduit wall and interior face of the wellbore, exiting the annular space and flowing back upward through the inside of the conduit.

In embodiments, the spacer fluid can be placed into a wellbore to separate a drilling fluid from a cementitious fluid. There can be a conduit inside the wellbore forming an annular space between an outside wall of the conduit and the wall of the wellbore. The conduit can be casing. In embodiments, at least a portion of the annular space comprises a permeable zone having an average fracture width of about W microns. A method of the present disclosure can further comprise: circulating the spacer fluid down through the conduit and back up through the annular space. In other embodiments, the direction of the circulating reverses and circulating the spacer fluid occurs down through the annular space and back up through the conduit. At least a portion of the particulate blend in the spacer fluid of the type disclosed herein is placed with the permeable zone.

Also disclosed herein is a method of servicing a wellbore with a conduit (e.g., casing) disposed therein. In embodiments, an outer surface of the conduit and the wellbore wall form an annular space. At least a portion of the wellbore wall within the annular space comprises a permeable zone having an average facture width of about W microns. A first fluid can be present in at least a portion of the annular space proximate the permeable zone. The first fluid can be a drilling fluid. The drilling fluid herein refers to any liquid and gaseous fluid and mixtures of fluids and solids used in operations of drilling a borehole into the earth. The drilling fluid can be water based, non-water based, and/or gaseous. In embodiments, the method further comprises placing a spacer fluid of the type disclosed herein (i.e., comprising a particulate blend of Type A and Type B particulate materials) into at least a portion of the annular space and displacing at least a portion of the first fluid from the annular space, wherein the spacer fluid comprises a particulate blend of the type disclosed herein and water. In embodiments, the method further comprises placing a cementitious fluid into at least a portion of the annular space and displacing at least a portion of the spacer fluid from the annular space. In embodiments, the method as disclosed herein can further comprise allowing at least a portion of the cementitious fluid to set.

Figure 1A:
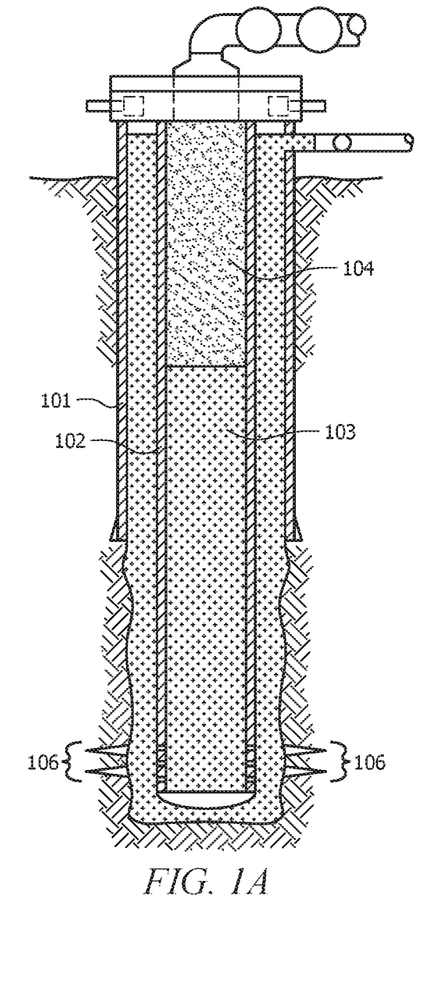
FIGS. 1A and 1B are cross-sectional, side views of a wellbore penetrating a subterranean formation, with a conduit disposed therein.
Figure 1B:
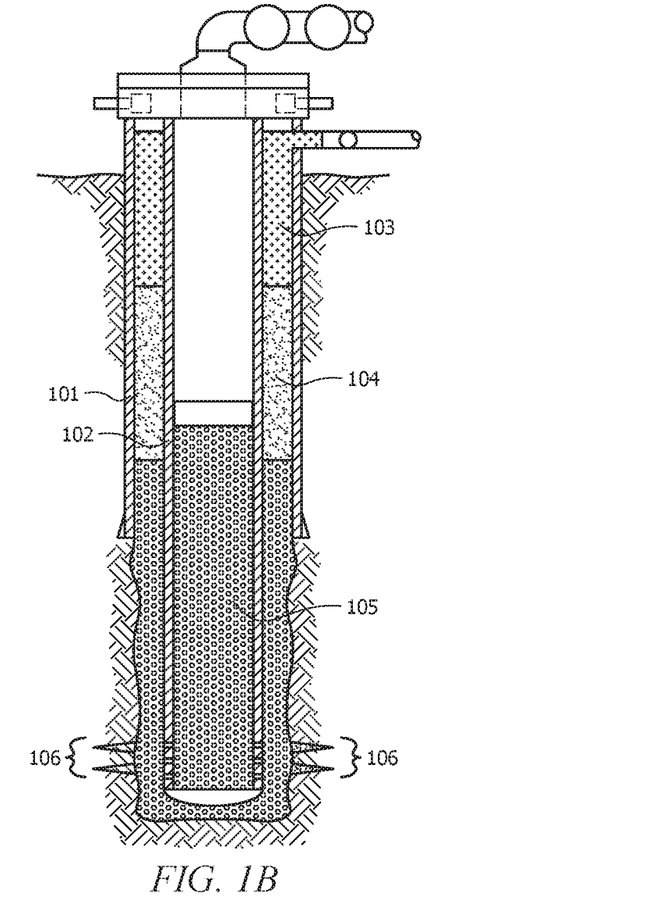

Disclosed herein is a method of servicing a wellbore 101 penetrating a subterranean formation as shown in FIGS. 1A and 1B. The wellbore 101 has a conduit 102 disposed therein forming an annular space between an outer wall of the conduit 102 and an inner wall of the wellbore 101. At least a portion of the inner wall of the wellbore 101 within the annular space comprises a permeable zone 106 having an average fracture width of about W microns. The inner flow bore of the conduit 102 and/or annular space may comprise a first fluid 103, for example a drilling fluid or mud, which may be circulated or static prior to pumping of a spacer fluid followed by a second fluid (e.g., cement slurry). In embodiments, the method comprises pumping a spacer fluid 104 followed by a second fluid 105 from the surface down an inner flow bore of the conduit 102, out an end of the conduit 102, and back up the annular space toward the surface, wherein the first fluid 103 is displaced from the conduit 102 and/or the annular space during the pumping. In some embodiments, the method comprises pumping the first fluid 103 followed by a spacer fluid 104 followed by a second fluid 105 from the surface down an inner flow bore of the conduit 102, out an end of the conduit 102, and back up the annular space toward the surface, wherein the first fluid 103 is displaced from the conduit 102 and/or the annular space during the pumping. The pumping of the first fluid, spacer fluid, and/or third fluid may be continuous or intermittent (e.g., paused to allow time for the particulate material in the spacer fluid to travel/migrate into the permeable zone 106). The spacer fluid 104 comprises a particulate blend and water. The particulate blend in the spacer fluid 104 comprises a type A particulate material and a type B particulate material. The type A particulate material can be characterized by a weight average particle size of equal to or greater than about W/3 microns, while the type B particulate material can be characterized by a weight average particle size of less than about W/3 microns. The weight ratio of the type A particulate material to the type B particulate material can be from about 0.05 to about 5. In embodiments, at least a portion of the particulate blend is placed with the permeable zone 106 having an average fracture width of about W microns. The conduit 102 can comprise casing. In embodiments, the first fluid 103 can be a drilling fluid, and the second fluid 105 can be a cementitious fluid.

Figures 2A, 2B:
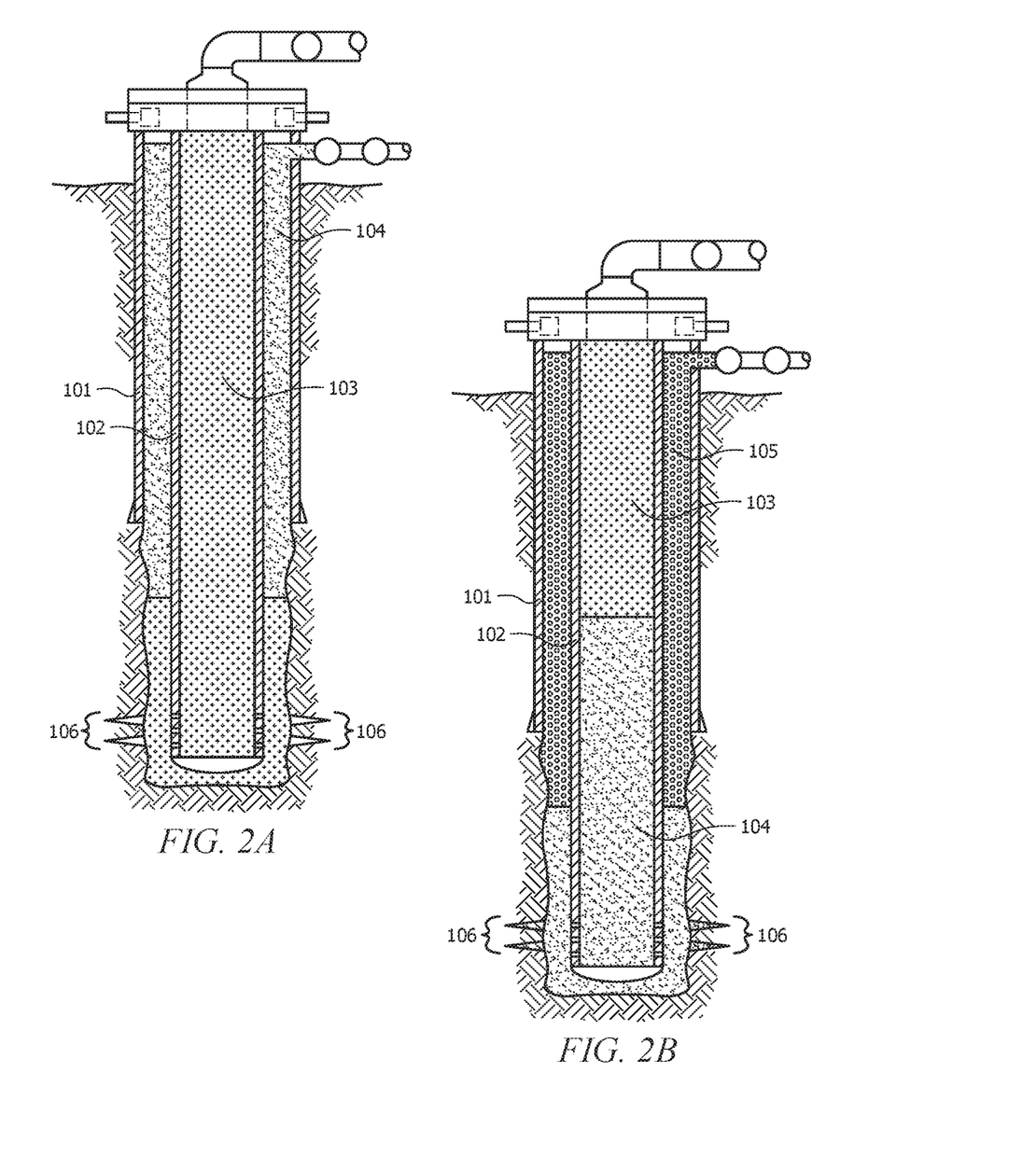
FIGS. 2A and 2B are cross-sectional, side views of a wellbore penetrating a subterranean formation, with a conduit disposed therein.

In embodiments, the direction of the flow of the first fluid, the spacer fluid, and the second fluid can reverse from that in the method disclosed above. Disclosed herein is a method of servicing a wellbore 101 penetrating a subterranean formation as shown in FIGS. 2A and 2B. The wellbore 101 has a conduit 102 disposed therein. The conduit 102 has an inner flow bore. An outer wall of the conduit 102 and an inner wall of the wellbore 101 form an annular space. At least a portion of the inner wall of the wellbore 101 within the annular space comprises a permeable zone 106 having an average fracture width of about W microns. The inner flow bore of the conduit 102 and/or annular space may comprise a first fluid 103, for example a drilling fluid or mud, which may be circulated or static prior to pumping of a spacer fluid followed by a second fluid (e.g., cement slurry). In embodiments, the method comprises pumping a spacer fluid 104 followed by a second fluid 105 from the surface down through the annular space, out an end of the annular space, and back up the inner flow bore toward the surface, wherein the first fluid 103 is displaced from the conduit 102 and/or the annular space during the pumping. In some embodiments, the method comprises pumping a first fluid 103 followed by a spacer fluid 104 followed by a second fluid 105 from the surface down through the annular space, out an end of the annular space, and back up the inner flow bore toward the surface, wherein the first fluid 103 is displaced from the conduit 102 and/or the annular space during the pumping. The pumping of the first fluid, spacer fluid, and/or third fluid may be continuous or intermittent (e.g., paused to allow time for the particulate material in the spacer fluid to travel/migrate into the permeable zone 106). The spacer fluid 104 comprises a particulate blend and water. The particulate blend in the spacer fluid 104 comprises a type A particulate material and a type B particulate material. The type A particulate material can be characterized by a weight average particle size of equal to or greater than about W/3 microns, while the type B particulate material can be characterized by a weight average particle size of less than about W/3 microns. The weight ratio of the type A particulate material to the type B particulate material can be from about 0.05 to about 5. In embodiments, at least a portion of the particulate blend is placed with the permeable zone 106 having an average fracture width of about W microns. The conduit 102 can comprise casing. In embodiments, the first fluid 103 can be a drilling fluid, and the second fluid 105 can be a cementitious fluid.

In embodiments, the WSF of the type disclosed herein (i.e., comprising a particulate blend of Type A and Type B particulate materials) can be used as a cementitious fluid, for example by adding a cementitious material of the type disclosed herein. The method of the present disclosure can comprise placing the cementitious fluid into the wellbore proximate a permeable zone and allowing at least a portion of the cementitious fluid to set. The cementitious fluid can be used to permanently seal the annular space between the conduit (e.g., casing) and the wellbore wall. The cementitious fluid can also be used to seal formations to prevent loss of drilling fluid (e.g., in squeeze cementing operations) and for operations ranging from setting kick-off plugs to plug and abandonment of a wellbore. In embodiments, a cementitious fluid of the type disclosed herein can be prepared by mixing cement, the particulate blend as disclosed herein, water, and suitable additives to form a pumpable slurry.

In embodiments, a cementitious fluid of the type disclosed herein (i.e., comprising a particulate blend of Type A and Type B particulate materials) can be employed in well completion operations such as primary and secondary cementing operations, wherein the cementitious fluid is place proximate a permeable zone. The cementitious fluid may be placed into an annulus of the wellbore and allowed to set such that it isolates the subterranean formation from a different portion of the wellbore. The cementitious fluid thus forms a barrier that prevents fluids in that subterranean formation from migrating into other subterranean formations. Within the annulus, the cementitious fluid also serves to support a conduit, e.g., casing, in the wellbore. In embodiments, the wellbore in which the cementitious fluid is positioned belongs to a multilateral wellbore configuration. It is to be understood that a multilateral wellbore configuration includes at least two principal wellbores connected by one or more ancillary wellbores.

In secondary cementing, often referred to as squeeze cementing, the cementitious fluid can be strategically positioned in the wellbore to plug a permeable zone such as a void or crack in the conduit, a void or crack in the hardened sealant (e.g., cement sheath) residing in the annulus, a relatively small opening known as a microannulus between the hardened sealant and the conduit, and so forth.

The WSF of the type described herein (i.e., comprising a particulate blend of Type A and Type B particulate materials) can also be used as a lost circulation fluid or a fluid loss control fluid. In embodiments, the wellbore comprises a permeable zone. The WSF can contact the permeable zone, and at least a portion of the particulate blend can be placed with the permeable zone to reduce an inflow of fluid from the formation into the wellbore and/or reduce an outflow of fluid from the wellbore into the formation.

In embodiments, the permeable zone comprises a flow path from the subterranean formation into the wellbore for the influx of water, gas, or both from the subterranean formation into the wellbore, and a wellbore servicing fluid of the type described herein (i.e., comprising a particulate blend of Type A and Type B particulate materials) may be placed proximate the permeable zone. Such permeable zones may be caused by the high pressure of fluid in the formation around the portion of the wellbore resulting in an undesired water/gas influx. Also, over the life of wells with multiple perforated and fractured zones, one or more of the multiple perforated and fractured zones may develop an undesired influx of water, gas, or both. Additionally, the one or more flow paths providing for an undesired water/gas influx can be formed as a result of loss of structural integrity of the casing (e.g., casing corrosion). It can be desired to treat the zone to restrict water/gas inflow by placement of a wellbore servicing fluid of the type described herein proximate the permeable zone. The lost circulation fluid can flow into at least a portion of the flow path and at least partially block the flow path, thus reduce and/or prevent the inflow of the water, gas, or both.

In embodiments, the permeable zone can comprise a lost circulation zone, for example, a depleted zone, a zone of relatively low pressure, a zone having naturally occurring fractures, a weak zone having fracture gradients exceeded by the hydrostatic pressure of the drilling fluid, and so forth. As a result, service provided by a wellbore servicing fluid in the zone is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation. The lost circulation fluid of the type described herein can flow into at least a portion of the zone and reduce and/or prevent flow of fluid from the wellbore into the formation.

The lost circulation fluid of the type described herein can form a non-flowing, intact mass capable of withstanding the hydrostatic pressure inside the lost circulation zone. Said lost circulation fluid can plug the zone and inhibit the loss of subsequently pumped wellbore servicing fluids thus allowing for further wellbore servicing operations.

In embodiments, a method of treating a subterranean formation penetrated by a wellbore having a lost circulation zone comprises drilling the wellbore with a drill bit connected to drill pipe. The method further comprises determining a location of a lost circulation zone in an uncased portion of the wellbore, discontinuing drilling and introducing, via the drill pipe, a lost circulation fluid of the type disclosed herein (i.e., comprising a particulate blend of Type A and Type B particulate materials) proximate the location of the lost circulation zone. In embodiments, the method further comprises allowing the lost circulation fluid to flow into at least a portion of the lost circulation zone to place the particulate blend of the type disclosed herein into the lost circulation zone, thus block at least a portion of the lost circulation zone. In embodiments, the method further comprises resuming drilling of the wellbore.

Various benefits may be realized by utilization of the presently disclosed methods and compositions. By incorporating the particulate blend as disclosed herein, the WSF can be used to reduce and/or prevent fluid communication between a wellbore and formation around the wellbore. The disclosed methods and compositions can be used during many different operations, such as drilling, cementing, and completion.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The fluid loss properties of a WSF of the type disclosed herein were investigated. Three samples of particulate blends having the particle size distributions set forth in Table 1 were used in fluid formulations WSF 1, WSF 2, and WSF 3, respectively. The WSFs have a density of 8.9 lb/gal.

TABLE 1

Particle Size Distribution for particulate materials

| | wt. % | | |
|---|---|---|---|
| Mesh Size | Particulate material 1 | Particulate material 2 | Particulate material 3 |
| 30 to 40 mesh | 9.4 | 7.4 | 0.1 |
| 40 to 100 mesh | 44 | 72.2 | 99.6 |
| Below 100 mesh | 46.6 | 20.4 | 0.3 |

The fluid loss on a 60 mesh screen for each of the formulations, WSF1, WSF2 and WSF3 was determined in accordance with the procedures in API-RP-10B-2 and the results are presented in Table 2. Table 2 shows the fluid loss in actual milliliter (ml) collected in the experiment. The results show that WSF1 (with particulate blend 1) exhibited the best fluid loss control on 60 mesh screens.

TABLE 2

Fluid loss on 60 mesh screen

| | Fluid loss (ml/30 min) | | |
|---|---|---|---|
| Temperature (° F.) | WSF 1 | WSF 1 | WSF 1 |
| 180 | 38 | 52 | 84 |
| 300 | 45 | 57 | 90 |

Example 2

A WSF with particulate materials was tested with a particle plugging apparatus (PPA). The ratio of larger particulate materials (>40 mesh) and small particulate materials (<40 mesh) varied. Table 3 shows the particle plugging test results on the ability of the WSF to plug a 1250 micron slot at 80° F.

TABLE 3

PPA testing with a 1250 micron slot at 80° F.

| Ratio of >40 mesh/<40 mesh | Spurt Loss (mL) |
|---|---|
| 7 | Total Loss |
| 6 | Total Loss |
| 5 | 50 |
| 4 | 14 |
| 3.5 | 11 |
| 3 | 12 |
| 2 | 10 |
| 1 | 4 |
| 0.5 | 8 |
| 0.25 | 18 |
| 0.2 | 16* |
| 0.17 | 22* |
| Only <40 mesh | Total Loss |

*multiple breakthroughs

The results show unexpectedly and advantageously that the presence of fine particulate materials (<40 mesh) was in fact a driver for efficiency and performance. Large particulate materials (>40 mesh) did not show a dominant efficiency effect as would be expected. As the ratio of the large particulate materials (>40 mesh) to the fine particulate materials (<40 mesh) increased from 1 to 7, the portion of the fine particulate materials was reduced, and the performance begins to suffer (from 4 mL loss to total loss). Likewise, as the ratio of the large particulate materials (>40 mesh) to the fine particulate materials (<40 mesh) decreased from 1 to 0 (only fine particulate materials), the portion of fine particulate materials increases to a large extent and the performance again begins to suffer (from 4 mL loss to total loss).

Additional Disclosure

The following are non-limiting, specific embodiments in accordance with the present disclosure:

A first embodiment, which is a method of servicing a wellbore penetrating a subterranean formation, comprising: placing a wellbore servicing fluid (WSF) into the wellbore proximate a permeable zone having an average fracture width of about W microns, wherein the WSF comprises a particulate blend and water, and wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5.

A second embodiment, which is the method of the first embodiment, wherein W is from about 10 microns to about 5000 microns.

A third embodiment, which is the method of the first embodiment or the second embodiment, wherein the WSF is a drilling fluid, a lost circulation fluid, a spacer fluid, a cement fluid, or a completion fluid.

A fourth embodiment, which is the method of any of the first through the third embodiments, wherein the type A particulate material and the type B particulate material are compositionally different.

A fifth embodiment, which is the method of any of the first through the fourth embodiments, wherein the type A particulate material is characterized by a Mohs hardness of less than about 4.

A sixth embodiment, which is the method of any of the first through the fifth embodiments, wherein the type B particulate material is characterized by a Mohs hardness of equal to or greater than about 3.

A seventh embodiment, which is the method of any of the first through the sixth embodiments, wherein the type B particulate material is calcium carbonate.

An eighth embodiment, which is the method of any of the first through the seventh embodiments, wherein the type A particulate material has a weight average particle size of from about 170 microns to about 1700 microns.

A ninth embodiment, which is the method of any of the first through the eighth embodiments, wherein the type B particulate material has a weight average particle size of from about 3 microns to about 1000 microns.

A tenth embodiment, which is the method of any of the first through the ninth embodiments, wherein the particulate blend is present in the WSF in an amount of from about 3 wt. % to about 25 wt. % based on a total weight of the WSF.

An eleventh embodiment, which is the method of any of the first through the tenth embodiments, wherein the water is selected from a group consisting of freshwater, saltwater, brine, seawater, and combinations thereof.

A twelfth embodiment, which is the method of any of the first through the eleventh embodiments, wherein the water is present in the WSF in an amount of from about 20 wt. % to about 95 wt. % based on a total weight of the WSF.

A thirteenth embodiment, which is the method of any of the first through the twelfth embodiments, wherein the WSF further comprises a cementitious material.

A fourteenth embodiment, which is the method of the thirteenth embodiment, wherein the cementitious material comprises Portland cement, pozzolana cement, gypsum cement, shale cement, acid cement, base cement, phosphate cement, high alumina content cement, slag cement, silica cement, high alkalinity cement, magnesia cement, or combinations thereof.

A fifteenth embodiment, which is the method of any of the thirteenth and the fourteenth embodiments, wherein the cementitious material is present in the WSF in an amount of from about 30 wt. % to about 80 wt. % based on a total weight of the WSF.

A sixteenth embodiment, which is the method of any of the first through the fifteenth embodiments, wherein the WSF further comprises a gelling agent.

A seventeenth embodiment, which is the method of the sixteenth embodiment, wherein the gelling agent comprises locust bean gum, Karaya gum, gum tragacanth, hydrophobically modified guars, high-molecular weight polysaccharides composed of mannose and galactose sugars, heteropolysaccharides obtained by fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly (acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

An eighteenth embodiment, which is the method of any of the sixteenth and the seventeenth embodiments, wherein the gelling agent has a molecular weight in a range of from equal to or greater than about 0.5 MM g/mol to equal to or less than about 5 MM g/mol.

A nineteenth embodiment, which is the method of any of the sixteenth through the eighteenth embodiments, wherein the gelling agent is present in the WSF in an amount of from about 0.001 wt. % to about 5 wt. %, based on a total weight of the WSF.

A twentieth embodiment, which is the method of any of the first through the nineteenth embodiments, wherein the WSF further comprises a fluid loss control additive.

A twenty-first embodiment, which is the method of the twentieth embodiment, wherein the fluid loss control additive comprises a polymer of methacrylates, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), acrylamide, N—N dimethyl acrylamide, 2-Acrylamido-2-methylpropane sulfonic acid (AMPS), N-vinyl pyrrolidone, acryloylmorpholine, or combinations thereof.

A twenty-second embodiment, which is the method of any of the twentieth and the twenty-first embodiments, wherein the fluid loss control additive is present in the WSF in an amount of from about 0.001 wt. % to about 10 wt. %, based on a total weight of the WSF.

A twenty-third embodiment, which is the method of any of the first through the twenty-second embodiments, wherein the WSF further comprises clay.

A twenty-fourth embodiment, which is the method of the twenty-third embodiment, wherein the clay comprises bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof.

A twenty-fifth embodiment, which is the method of any of the twenty-third and the twenty-fourth embodiments, wherein the clay is present in the WSF in an amount of from about 1 wt. % to about 20 wt. % based on a total weight of the WSF.

A twenty-sixth embodiment, which is the method of any of the first through the twenty-fifth embodiments, wherein the WSF further comprises a pH adjusting agent.

A twenty-seventh embodiment, which is the method of the twenty-sixth embodiment, wherein the pH adjusting agent is selected from a group consisting of a base, an acid, and a pH buffer.

A twenty-eighth embodiment, which is the method of the twenty-seventh embodiment, wherein the acid comprises mineral acids, organic acids, ammonium salts and salts of weak bases, or combinations thereof.

A twenty-ninth embodiment, which is the method of any of the twenty-sixth through the twenty-eighth embodiments, wherein the pH adjusting agent is present in the WSF in an amount of from about 1 wt. % to about 15 wt. % based on a total weight of the WSF.

A thirtieth embodiment, which is the method of any of the first through the twenty-ninth embodiments, wherein the WSF further comprises one or more additives.

A thirty-first embodiment, which is the method of the thirtieth embodiment, wherein the one or more additives comprise a viscosifier, an emulsifier, a defoamer, an expansion agent, a salt, a corrosion inhibitor, a mutual solvent, a breaking agent, a relative permeability modifier, a cross-linker, a flocculant, a water softener, an oxidation inhibitor, a thinner, a scavenger, a gas scavenger, a lubricant, a friction reducer, a bridging agent, a vitrified shale, a thixotropic agent, a dispersing agent, a weight reducing additive, a heavyweight additive, a surfactant, a scale inhibitor, a clay control agent, a clay stabilizer, a silicate-control agent, a biocide, a biostatic agent, a storage stabilizer, a filtration control additive, a suspending agent, a foaming agent, latex emulsions, a formation conditioning agent, elastomers, gas/fluid absorbing materials, resins, superabsorbers, mechanical property modifying additives, inert particulates, or combinations thereof.

A thirty-second embodiment, which is the method of any of the thirtieth and the thirty-first embodiments, wherein the one or more additives are present in the WSF in an amount of from about 0 wt. % to about 15 wt. % based on a total weight of the WSF.

A thirty-third embodiment, which is the method of any of the first through the thirty-second embodiments, wherein the WSF has a density of from about 7 lb/gal to about 20 lb/gal.

A thirty-fourth embodiment, which is the method of any of the first through the thirty-third embodiments, wherein the WSF has an actual fluid loss of from about 10 ml per 30 minutes to about 80 ml per 30 minutes on a 60 mesh screen at 180° F., when measured in accordance with test standard API-RP-10B-2.

A thirty-fifth embodiment, which is the method of any of the first through the thirty-fourth embodiments, wherein the WSF has an actual fluid loss of from about 10 ml per 30 minutes to about 80 ml per 30 minutes on a slot with a width of about W microns at 180° F., when measured in accordance with test standard API-RP-10B-2.

A thirty-sixth embodiment, which is the method of any of the first through the thirty-fifth embodiments, wherein the WSF has an actual fluid loss of from about 20 ml per 30 minutes to about 120 ml per 30 minutes on a 60 mesh screen at 300° F., when measured in accordance with test standard API-RP-10B-2.

A thirty-seventh embodiment, which is the method of any of the first through the thirty-sixth embodiments, wherein the WSF has an actual fluid loss of from about 20 ml per 30 minutes to about 120 ml per 30 minutes on a slot with a width of about W microns at 300° F., when measured in accordance with test standard API-RP-10B-2.

A thirty-eighth embodiment, which is the method of any of the first through the thirty-seventh embodiments, wherein the method further comprises circulating the WSF down through a conduit and back up through an annular space between an outside wall of the conduit and a wall of the wellbore.

A thirty-ninth embodiment, which is the method of any of the first through the thirty-seventh embodiments, wherein the method further comprises: circulating the WSF down through an annular space between an outside wall of a conduit and a wall of the wellbore and back up through the conduit.

A fortieth embodiment, which is the method of any of the first through the thirty-ninth embodiments, wherein at least a portion of the particulate blend is placed with the permeable zone having an average fracture width of about W microns.

A forty-first embodiment, which is a method of servicing a wellbore with casing disposed therein to form an annular space between a wellbore wall and an outer surface of the casing, wherein at least a portion of the wellbore wall within the annular space comprises a permeable zone having an average facture width of about W microns, wherein a first fluid is present in at least a portion of the annular space proximate the permeable zone, comprising: placing a spacer fluid into at least a portion of the annular space and displacing at least a portion of the first fluid from the annular space, wherein the spacer fluid comprises a particulate blend and water, wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5; and placing a cementitious fluid into at least a portion of the annular space and displacing at least a portion of the spacer fluid from the annular space.

A forty-second embodiment, which is the method of the forty-first embodiment, wherein the first fluid is a drilling fluid.

A forty-third embodiment, which is the method of any of the forty-first and the forty-second embodiments, further comprising allowing at least a portion of the cementitious fluid to set.

A forty-fourth embodiment, which is a method of servicing a wellbore with a conduit disposed therein to form an annular space between a wellbore wall and an outer surface of the conduit, wherein at least a portion of the wellbore wall within the annular space comprises a permeable zone having an average facture width of about W microns, comprising pumping a first fluid followed by a spacer fluid followed by a second fluid from a surface down an inner flow bore of the conduit, out an end of the conduit, and back up the annular space toward the surface, wherein the spacer fluid comprises a particulate blend and water, wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5.

A forty-fifth embodiment, which is a method of servicing a wellbore with a conduit disposed therein to form an annular space between a wellbore wall and an outer surface of the conduit, wherein at least a portion of the wellbore wall within the annular space comprises a permeable zone having an average facture width of about W microns, comprising pumping a first fluid followed by a spacer fluid followed by a second fluid from a surface down through the annular space, out an end of the annular space, and back up an inner flow bore of the conduit toward the surface, wherein the spacer fluid comprises a particulate blend and water, wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5.

A forty-sixth embodiment, which is the method of any of the forty-fourth and the forty-fifth embodiments, wherein the conduit comprises casing, the first fluid is a drilling fluid, and the second fluid is a cementitious fluid.

A forty-seventh embodiment, which is the method of any of the first through the forty-sixth embodiments, wherein at least a portion of the particulate blend is placed with the permeable zone having an average fracture width of about W microns to reduce an inflow of fluid from a formation into the wellbore and/or reduce an outflow of fluid from the wellbore into the formation.

A forty-eighth embodiment, which is a method of treating a subterranean formation penetrated by a wellbore, comprising: drilling the wellbore with a drill bit connected to drill pipe; determining a location of a lost circulation zone in an uncased portion of the wellbore, wherein the lost circulation zone has an average fracture width of about W microns; discontinuing drilling; introducing, via a drill pipe, a WSF at the location proximate the lost circulation zone, wherein the WSF comprises a particulate blend and water, wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5; allowing the WSF to flow into at least a portion of the lost circulation zone to place the particulate blend into the lost circulation zone; allowing the particulate blend to block at least a portion of the lost circulation zone; and resuming drilling of the wellbore.

A forty-ninth embodiment, which is the method of any of the thirteenth through the thirty-seventh embodiments, further comprising allowing at least a portion of the WSF to set.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising: placing a wellbore servicing fluid (WSF) into the wellbore proximate a permeable zone having fluid flow paths and an average fracture width of about W microns wherein W is from about 500 microns to about 5000 microns and wherein the average fracture width is an average size of openings of the fluid flow paths, wherein the WSF comprises a particulate blend and water, and wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5 and wherein the type A particulate material and the type B particulate material are compositionally different.

2. The method of claim 1, wherein W is from about 750 microns to about 5000 microns.

3. The method of claim 1, wherein the WSF is a drilling fluid, a lost circulation fluid, a spacer fluid, a cement fluid, or a completion fluid.

4. The method of claim 1, wherein the type A particulate material is characterized by a Mohs hardness of less than about 4.

5. The method of claim 1, wherein the type B particulate material is characterized by a Mohs hardness of equal to or greater than about 3.

6. The method of claim 1, wherein the type B particulate material is calcium carbonate.

7. The method of claim 1, wherein the type A particulate material has a weight average particle size of from about 170 microns to about 1700 microns.

8. The method of claim 1, wherein the type B particulate material has a weight average particle size of from about 3 microns to about 1000 microns.

9. The method of claim 1, wherein the particulate blend is present in the WSF in an amount of from about 3 wt. % to about 25 wt. % based on a total weight of the WSF.

10. The method of claim 1, wherein the water is present in the WSF in an amount of from about 20 wt. % to about 95 wt. % based on a total weight of the WSF.

11. The method of claim 1, wherein the WSF further comprises a cementitious material.

12. The method of claim 11, wherein the cementitious material is present in the WSF in an amount of from about 30 wt. % to about 80 wt. % based on a total weight of the WSF.

13. The method of claim 11, further comprising allowing at least a portion of the WSF to set.

14. The method of claim 1, wherein at least a portion of the particulate blend is placed into the permeable zone having an average fracture width of about W microns.

15. The method of claim 1, wherein at least a portion of the particulate blend is placed into the permeable zone having an average fracture width of about W microns to reduce an inflow of fluid from a formation into the wellbore and/or reduce an outflow of fluid from the wellbore into the formation.

16. The method of claim 1, wherein the wellbore servicing fluid is characterized by actual fluid loss of from about 10 ml per 30 minutes to about 80 ml per 30 minutes on a 60 mesh screen, at about 180° F. when measured in accordance with test standard API-RP-10B-2.

17. A method of servicing a wellbore penetrating a subterranean formation with casing disposed therein to form an annular space between a wellbore wall and an outer surface of the casing, wherein at least a portion of the wellbore wall within the annular space comprises a permeable zone having fluid flow paths and an average fracture width of about W microns wherein W is from about 500 microns to about 5000 microns and wherein the average fracture width is an average size of openings of the fluid flow paths, wherein a first fluid is present in at least a portion of the annular space proximate the permeable zone, comprising: placing a spacer fluid into at least a portion of the annular space and displacing at least a portion of the first fluid from the annular space, wherein the spacer fluid comprises a particulate blend and water, wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5 and wherein the type A particulate material and the type B particulate material are compositionally different; and placing a cementitious fluid into at least a portion of the annular space and displacing at least a portion of the spacer fluid from the annular space.

18. The method of claim 17, wherein the first fluid is a drilling fluid.

19. The method of claim 17, further comprising allowing at least a portion of the cementitious fluid to set.

20. A method of treating a subterranean formation penetrated by a wellbore, comprising:
drilling the wellbore with a drill bit connected to drill pipe;
determining a location of a lost circulation zone in an uncased portion of the wellbore, wherein the lost circulation zone has fluid flow paths and an average fracture width of about W microns wherein W is from about 500 microns to about 5000 microns and wherein the average fracture width is an average size of openings of the fluid flow paths;
discontinuing drilling;
introducing, via a drill pipe, a WSF at the location proximate the lost circulation zone, wherein the WSF comprises a particulate blend and water,
wherein the particulate blend comprises (a) a type A particulate material characterized by a weight average particle size of equal to or greater than about W/3 microns, and (b) a type B particulate material characterized by a weight average particle size of less than about W/3 microns, wherein a weight ratio of the type A particulate material to the type B particulate material is from about 0.05 to about 5 and wherein the type A particulate material and the type B particulate material are compositionally different;
allowing the WSF to flow into at least a portion of the lost circulation zone to place the particulate blend into the lost circulation zone;
allowing the particulate blend to block at least a portion of the lost circulation zone; and
resuming drilling of the wellbore.

* * * * *